United States Patent [19]
Hoberman et al.

[11] Patent Number: 5,490,257
[45] Date of Patent: Feb. 6, 1996

[54] RAM BASED FIFO MEMORY HALF-FULL DETECTION APPARATUS AND METHOD

[75] Inventors: Barry A. Hoberman, Cupertino; Stuart T. Auvinen, Santa Cruz; Patrick Wang, Palo Alto; David Wang, Cupertino, all of Calif.

[73] Assignee: Advanced Micro Devices, Inc., Sunnyvale, Calif.

[21] Appl. No.: 840,024

[22] Filed: Feb. 24, 1992

[51] Int. Cl.$^6$ ............................ G06F 12/00; G11C 8/00
[52] U.S. Cl. .................... 395/427; 365/189.04; 365/221; 365/236; 364/DIG. 1
[58] Field of Search .................... 395/425, 400; 364/244.4, 246.4, 251.7, 965.6, 966.3, 960.7; 365/189.04, 230.04, 241, 221, 236

[56] References Cited

U.S. PATENT DOCUMENTS

| | | | |
|---|---|---|---|
| 3,851,313 | 11/1974 | Chang | 340/173 R |
| 4,486,854 | 12/1984 | Yuni | 395/425 |
| 4,864,543 | 9/1989 | Ward et al. | 365/221 |
| 4,875,196 | 10/1989 | Spaderna et al. | 365/238 |
| 4,888,739 | 12/1989 | Frederick et al. | 365/221 |
| 4,954,987 | 9/1990 | Auvinen et al. | 365/189.02 |
| 5,084,841 | 1/1992 | Williams et al. | 365/189.07 |

*Primary Examiner*—Michael A. Whitfield
*Attorney, Agent, or Firm*—Benman, Collins & Sawyer

[57] ABSTRACT

A method for detecting a half-full condition of a first-in, first-out memory array. The method of the invention includes the steps of a) moving a write pointer through the array to write data to alternating rows of the memory array; b) moving a read pointer through the array to read data from the alternating rows of the memory array in first-in, first-out order; and c) providing a half-full indication when the read pointer and the write pointer point to adjacent rows in the memory array. This method eliminates the need to route lines across the array to detect a half-full condition, thereby reducing die and power requirements and offering an increase in speed.

4 Claims, 4 Drawing Sheets

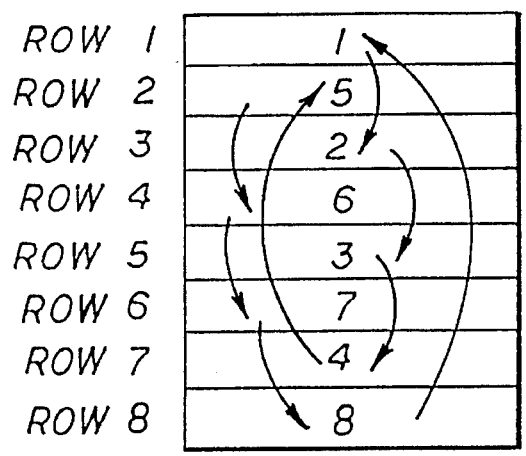
FIG. 4
FIG. 6
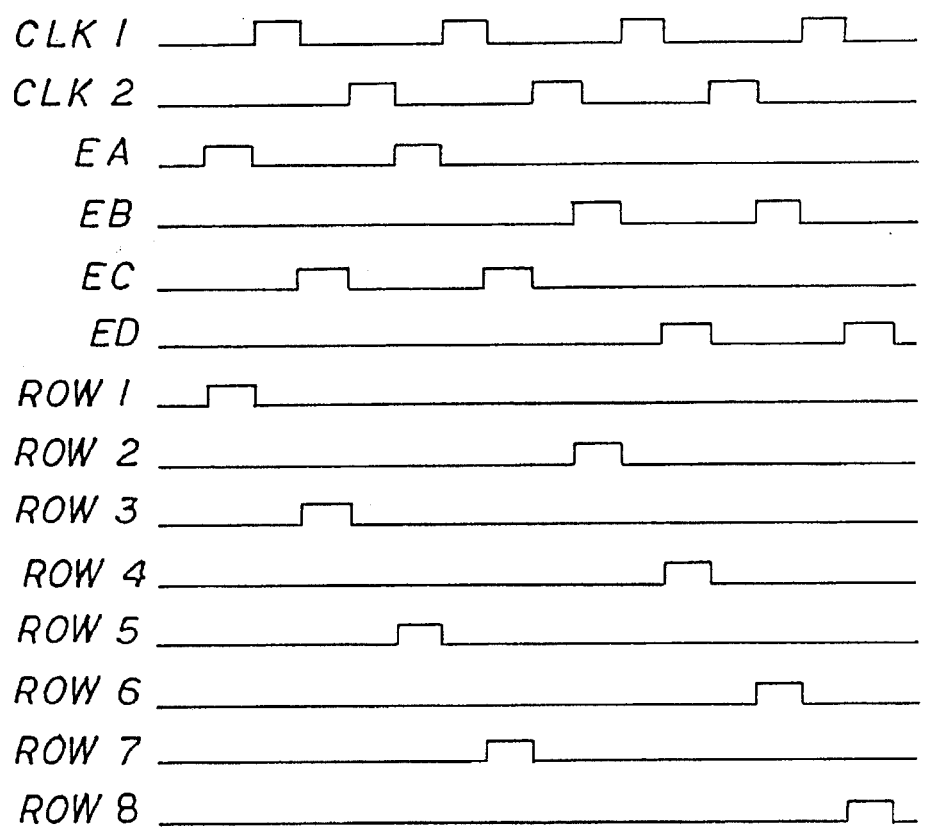

RAM BASED FIFO MEMORY HALF-FULL DETECTION APPARATUS AND METHOD

BACKGROUND OF THE INVENTION

1. Field of the Invention

The present invention relates to Random Access Memory (RAM) based first-in, first-out (FIFO) memories. More specifically, the present invention relates to methods and apparatus for detecting a half-full condition of the FIFO memories by employing a row pointer design which generates addresses for reordering the row filling sequence of an array.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

A Random Access Memory (RAM) is regularly employed as a data storage device in computer systems. A FIFO memory is a buffer device designed to temporarily store data generated at a high rate of speed by a first component until a second slower component can accept and use the data. The FIFO memory can be a two-dimensional array with data stored at a predetermined memory location as specified by row and column addresses. The entry of new data displaces the original stored data by shifting the original data to another memory address. Thereafter, data exits the FIFO memory at a time commensurate with the availability of the second component.

Customarily, these devices are equipped with circuitry that detects and indicates their full or empty condition. When the empty condition occurs, it is no longer possible to read data out of the FIFO memory. When the full condition is achieved, on the other hand, it is no longer possible to write data into the FIFO memory. Often, the user has little control over the incoming and outgoing data stream and adequate warning is necessary before the reading-out or writing-in process must be stopped. Therefore, in addition to detecting the empty and full conditions of the FIFO memory, it is also necessary to detect the half-full condition to provide the user with adequate notice prior to achieving the empty or full condition. Notice is typically provided by status flags implemented electronically which tend to appear without warning.

Several methods are known in the art to provide notice of an impending memory full condition. A first approach involved the utilization of two counters as an adjunct to the FIFO memory which served to count the words entering and exiting the memory. The write word count was then compared with the read word count to indicate the empty, full or half-full condition of the memory.

A significant shortcoming with this first approach has been that as the depth of the FIFO memory has increased, the size of the counter has become increasingly large. This has slowed the operation of the counter and, consequently, that of the FIFO memory. The increased activity of larger counters also resulted in increased line loading on the counter register further slowing the counting process. The problem was further exacerbated by the increase in size of the FIFO memory since status flags became increasingly important with larger memory size.

A second approach to detect the remaining capacity of a FIFO memory involved a monitoring of the read and write row and column pointers. The empty and full conditions were detected when the read row pointer and the write row pointer each pointed to the same row and when the read column pointer and the write column pointer each pointed to the same column. This was a simple and inexpensive method to implement status flags for indicating the remaining capacity of the FIFO memory.

However, with this second approach, the half-full FIFO memory condition was not easily detected. The detection of the half-full condition while utilizing the normal sequential row filling order has been difficult because the write row pointer was pointing to a row that was "N/2" rows ahead of the read row pointer where "N" is the total number of rows in the FIFO memory. Although the logic was simple (write row N and read row N/2), the fact that the rows "N" and "N/2" were physically separated by half of the memory array required that a wire be routed from row "N" to row "N/2" where a logical AND gate was located. This scheme was expensive in terms of chip area as it required the routing of "N/2" lines (128 lines in certain prior art schemes) between the leads of the write row and read row pointers. The routing of these additional "N/2" lines potentially occupied about 25% of the surface area of the die substrate, which was prohibitive.

Also, because of the physical separation of the rows "N" and "N/2" line loading on the "N/2" lines was increased since the FIFO memory must be traversed in both the horizontal and vertical directions. Therefore, detection of the half-full condition in a FIFO memory was also slower using this second approach.

Thus, there is a need in the art for a memory counting scheme for deeper and faster FIFO memories having a design which permits the write row pointer to point to a row which is adjacent to the row pointed to by the read row pointer during the half-full condition. This design eliminates the counters positioned as an adjunct to the memory, minimizes both the area of the die substrate and line loading and does not delay the operation of the FIFO memory.

SUMMARY OF THE INVENTION

The need in the art is addressed by the system and method of the present invention for detecting a half-full condition of a first-in, first-out memory array. The method of the invention includes the steps of a) moving a write pointer through the array to write data to alternating rows of the memory array; b) moving a read pointer through the array to read data from the alternating rows of the memory array in first-in, first-out order; and c) providing a half-full indication when the read pointer and the write pointer point to adjacent rows in the memory array. This method eliminates the need to route lines across the array to detect a half-full condition, thereby reducing die and power requirements and offering an increase in speed.

BRIEF DESCRIPTION OF THE DRAWINGS

FIG. 4 is an illustration of the row filling pattern for an 8-row memory array of the half-full row detection circuit of FIG. 3.

FIG. 6 is a timing diagram of the row filling sequence of the half-full row detection circuit of FIG. 3.

DESCRIPTION OF THE INVENTION

Figure 1:
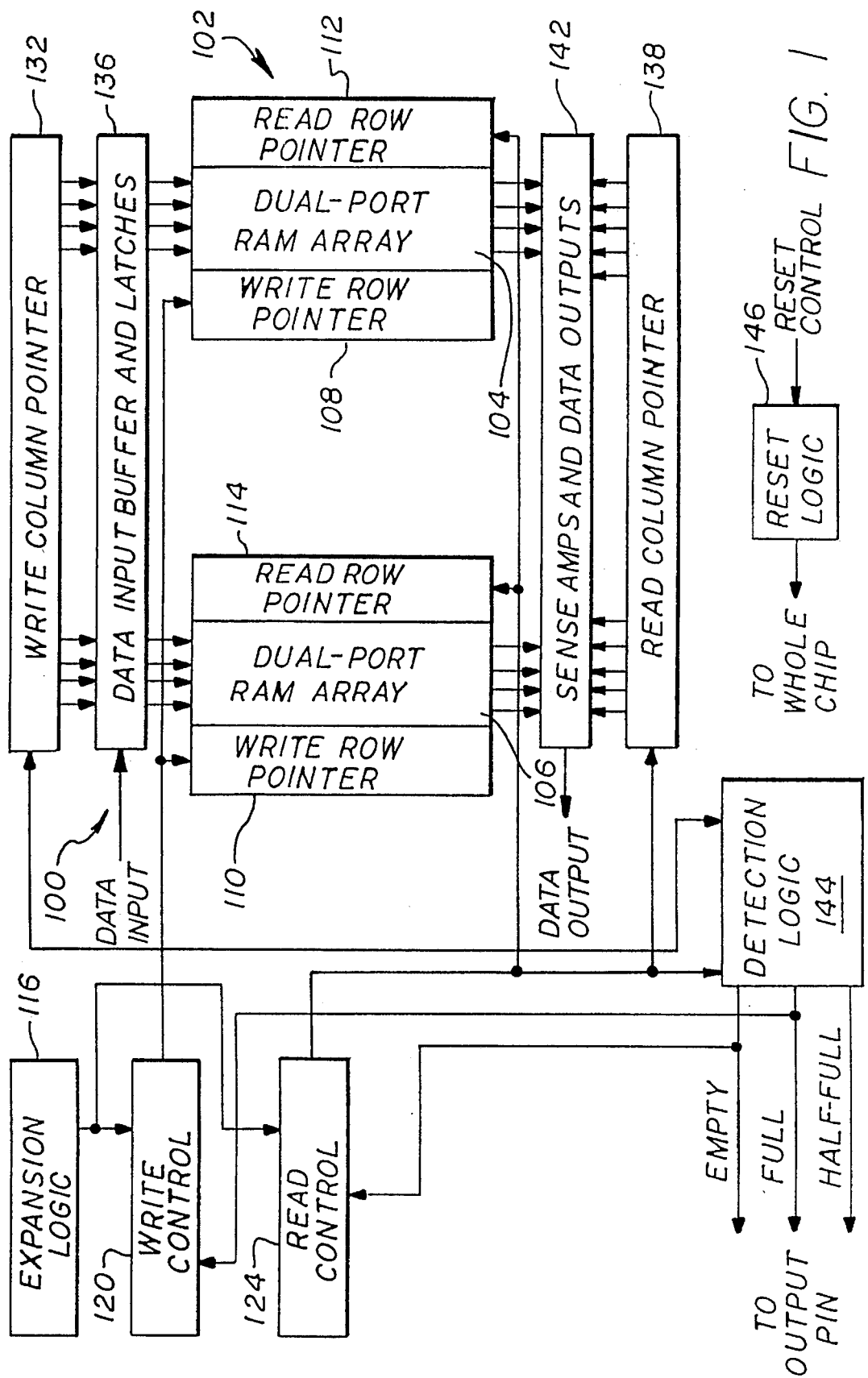
FIG. 1 is a simplified block diagram illustrating the components of a random access memory (RAM) based first-in, first-out (FIFO) memory employing the teachings of the present invention.

FIG. 1 is a simplified block diagram illustrating a random access memory (RAM) based first-in, first-out (FIFO) memory system 100 employing the teachings of the present invention. As shown in FIG. 1, the system 100 includes a dual port RAM array 102. The RAM array 102 is divided into a right bank 104 and a left bank 106. The array 102 is dual port in that data is written in one bank while being read from the other. A pair of write row pointers 108 and 110 associated with the left and right banks 104 and 106, respectively, facilitate the writing of data into the memory 102 while a pair of read row pointers 112 and 114 associated with RAM arrays 104 and 106, respectively, facilitate reading data out of the memory 102.

An expansion logic circuit 116 extends the memory of the system 100 by generating a signal to a write control circuit 120 and to a read control circuit 124. The write control circuit 120 provides enable signals for the operation of the write row pointers 108 and 110 while the read control circuit 124 provides enable signals for the operation of the read row pointers 112 and 114. The expansion logic circuit, write control circuit and the read control circuit are known in the art and may be of conventional design.

The write column control signals are generated by a write column pointer 132. Global input data provided off-chip is input to a selected latch of an array of latches 136. The latch is selected by the write column pointer 132 via a data input buffer (not shown). The latches 136 serve to temporarily store input data signals. The stored data signals are then clocked directly to corresponding cells in the left and right banks 104 and 106 of the RAM array 102.

Similarly, read column control signals are generated by a read column pointer 138. Stored data signals from word lines in the left and right banks 104 and 106 of the RAM array 102 are applied to a plurality of sense amplifiers and corresponding data output buffers in an array 142. The read column pointer 138 activates a selected sense amplifier for the read operation. The sense amplifier amplifies the data signal and routes it off-chip via a data output line.

As discussed more fully below, in the illustrative embodiment, a detection logic circuit 144 receives control signals from the write column pointer 132 and the read column pointer 138 and generates an EMPTY, FULL OR HALF-FULL output signal. Empty and full conditions are detected in a conventional manner. The half-full condition is detected in a novel and advantageous manner as discussed more fully below. Those skilled in the art will appreciate that the roles of the column and row pointers may be reversed without departing from the scope of the present invention.

A reset logic circuit 146 is connected to and resets each of the other circuits of the memory system 100 to an initial set of conditions when activated by a reset control signal or on power-up. On reset, the circuit 100 assumes an empty state and the read and write row pointers point to the same position (cell) in the memory array 102. Thereafter, the system 100 is set to receive input data.

As mentioned above, the detection of the empty and full conditions of the memory array occurs when the read row pointers 112 and 114 and the write row pointers 108 and 110 point to the same row, and the read and write column pointers 132 and 138 point to the same column. In other words, the empty and full conditions are detected when the read and write pointers point to the same cell in the array. Half-full detection has heretofore been somewhat problematic.

Figure 2:
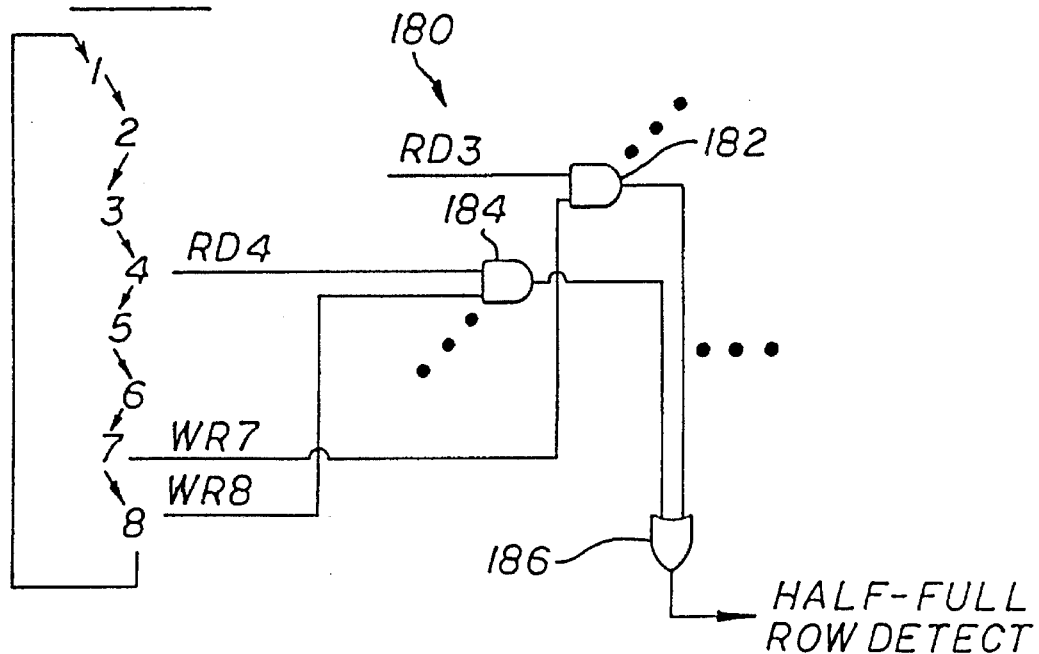
FIG. 2 is a schematic diagram of a conventional half-full row detection circuit.

A schematic diagram of a half-full row detection circuit 180 constructed in accordance with conventional teachings is shown in FIG. 2. The circuit 180 may be an eight row, sixteen column array in which the data stored in one row is read-out while new data is written into another row. Thus, for example, data may be written into row "N" while data stored in row "N/2" is being read out. The detection circuit 180 employs a plurality of two-input AND-gates of which only gates 182 and 184 are shown. The AND-gates receive both read and write control signals from the read and write row pointers. Examples of such signals include a read signal RD3 and a write signal WR7 which are fed to the first AND-gate 182 and a read signal RD4 and a write signal WR8 fed to a second AND-gate 184. The signals generated by the first and second AND-gates 182 and 184 are applied to an OR-gate 186. The inputs to the AND-gates are selected to represent read and write signals which are half an array apart. Thus, the output of the OR-gate 186 provides an output signal that is a half-full row detect signal if any of the input signals to the OR-gate is high.

While this scheme appears to be satisfactory with respect to the illustrative system with a small memory, the problem becomes acute when large memory arrays are employed. Consider a memory with 512 rows. Half-full detection in accordance with the illustrated scheme would require 512 AND-gates each having two inputs, one of which is 256 rows distant from the other. It is readily apparent that this scheme would require the routing of many lines which would consume considerable space on the die.

Figure 3:
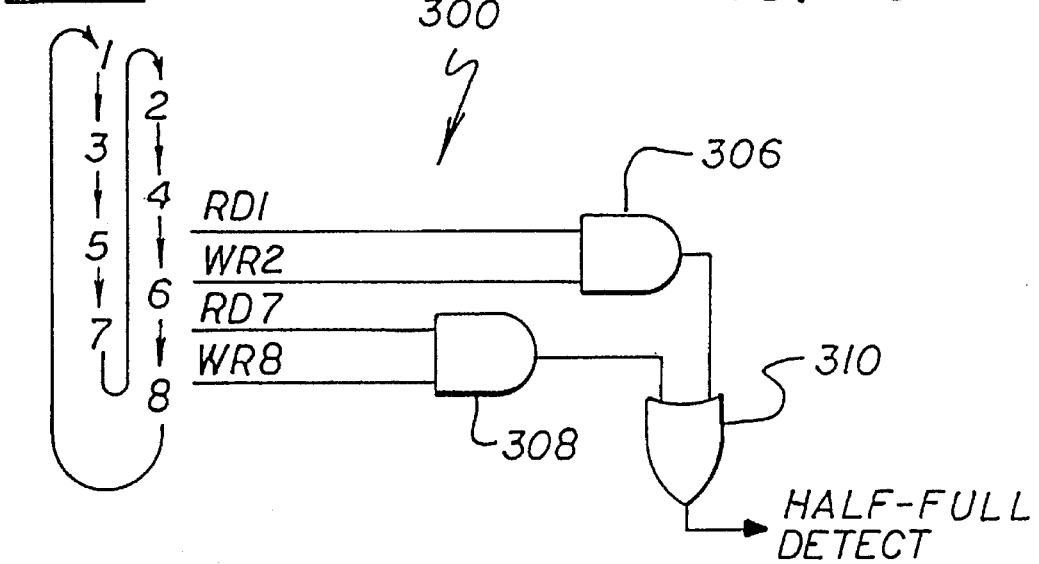
FIG. 3 is a simplified schematic diagram illustrative of the half-full detection scheme of the present invention.

This problem is substantially overcome by the half-full detection scheme of the present invention which is illustrated in the simplified schematic diagram of FIG. 3. In accordance with the present invention, the row filling order of the row pointer is changed such that the rows are filled, for example, in odd then even fashion as shown. That is, row 1 is filled, then row 3, then 5, and 7 whereupon the pointer returns to near the top of the array and fills rows 2, 4, 6, then 8. This row filling sequence is further illustrated in FIG. 4.

Recalling that on reset, the read and write row and column pointers are pointing at the same position. With eight rows to fill, the memory is half-full when four rows are filled. Thus, assuming that the starting position is row 1, rows 1, 3, 5 and 7 would be written and the write row pointer would be pointing to row 2. However, the read row pointer would be half an array behind the write row pointer and still pointing at row 1. Thus, if the line to the array from the row pointer providing the enable for a row 1 read is input to an AND-gate along with the line to the array from the row pointer providing a row 2 write, the output of the AND-gate would be high and a half-full condition would be indicated. The half-full detection circuit of the present invention 300 provides an arrangement in accordance with this teaching in which the row (or column) filling order is changed to an alternating filling order (through two passes through the array) and the inputs to the AND-gates are adjacent rows, row n and row n+1, where n=1 to N and N is the number of rows. It is understood that if the rows are written and read in accordance with the alternating scheme, the columns are addressed in a conventional manner along the entire length of each column for increment in the row filling order. That is, for each row, every column is addressed in order before the next (alternating) row is selected. Or, in the alternative, the columns are read and/or written in the alternating fashion and the row positions are all addressed for each incremental column position.

In any event, in the half-full detection logic circuit 300 of the present invention, illustrated in FIG. 3, an AND-gate is connected to each of the row or column pointer output lines. AND-gates 306 and 308 are shown in FIG. 3 for illustration, however the number of AND-gates required is dependent upon the size of the memory array 102. The signals generated by the AND-gates 306 and 308 are applied to an OR-gate 310 which provides an output signal. This output signal will be a high half-full row detect signal if either input signal to the OR-gate is high.

Figure 5:
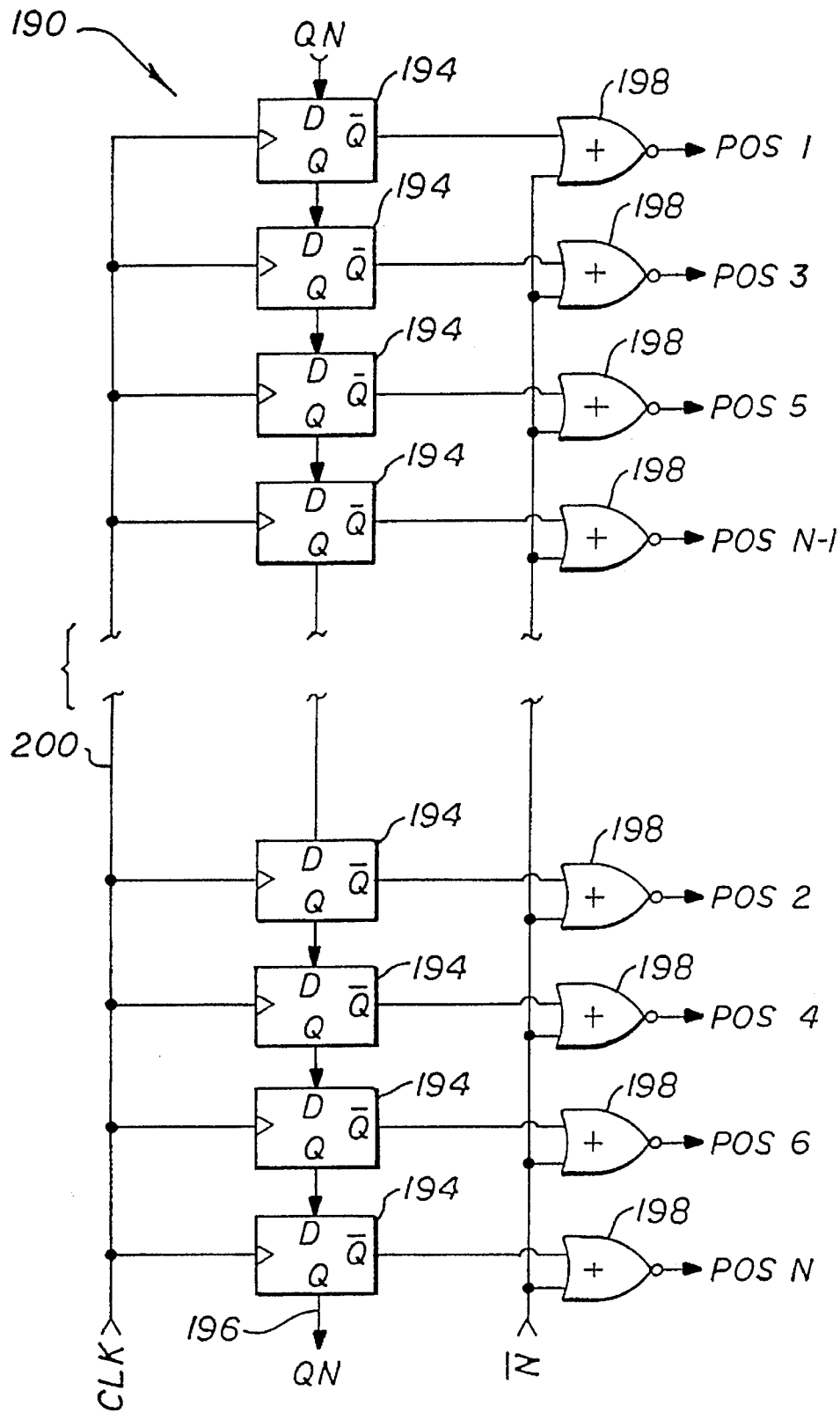
FIG. 5 is a schematic diagram of a read or write row or column pointer 190 constructed in accordance with the present teachings.

FIG. 5 is a schematic diagram of a read or write row or column pointer 190 constructed in accordance with the present teachings. The pointer 190 includes a plurality of D flip-flops 194 having each a complementary Q output. This complementary output is provided as one input to a corresponding NOR gate 198. A clock signal is applied to each of the flip-flops 194. A token $Q_N$ is applied to the first flip-flop from the last flip-flop. The flip-flops are arranged in cascade with the Q output of each providing the D input of the adjacent flip-flop. Thus, when clocked, the token is passed from one flip-flop to the next such that the Q output of one flip-flop goes high and the complementary Q output goes low. The low output is provided a corresponding NOR gate 198. Thus, when the enable signal is high, the NOR gate will be enabled by the complementary enable signal and its output will be high and provide a row or column pointing signal. Note the order of the positions to be filled by the outputs of the NOR gates. These outputs are provided to the sense amps or latches, as discussed above, and to detection logic circuit 144 of FIG. 1 in which the half-full detection logic circuit of the present invention 300 resides.

FIG. 6 is a timing diagram illustrative of the operation of the present invention.

The present invention has been described herein with reference to a particular embodiment for a particular application. Nonetheless, it is not intended that the invention be limited thereto. Those having ordinary skill in the art and access to the teachings provided herein will recognize additional modifications, applications, and embodiments within the scope thereof.

It is therefore intended by the appended claims to cover any and all such modifications, applications, and embodiments within the scope of the present invention.

Accordingly,

What is claimed is:

1. A system for detecting a half-full condition of a memory array having N×M memory cells, where N is the number of rows in the array and M is the number of columns, said half-full detection system comprising:

write row pointing means for providing a write control pointer to alternating rows of said memory array;

read row pointing means for providing a read control pointer to alternating rows of said memory array; and detection logic means for detecting a read control pointer on one row of said memory array and a write control pointer on an adjacent row of said memory array, said detection logic means further including N AND gates, each gate having a read control pointer from one row, row n, where n=1 to N, as one input and a write control pointer on an adjacent row, row n+1 as a second input.

2. The invention of claim 1 wherein said detection logic means includes an OR gate and the outputs of said AND gates are provided as the inputs thereof.

3. A system for detecting a half-full condition of a memory array having N×M memory cells, where N is the number of rows in the array and M is the number of columns, said half-full detection system comprising:

write column pointing means for providing a write control pointer to alternating columns of said memory array;

read column pointing means for providing a read control pointer to alternating columns of said memory array; and detection logic means for detecting a read control pointer on one column of said memory array and a write control pointer on an adjacent column of said memory array, said detection logic means further including M AND gates, each gate having a read control pointer from one column, column m, where m=1 to M, as one input and a write control pointer on an adjacent column, column n+1 as a second input.

4. The invention of claim 3 wherein said detection logic means includes an OR gate and the outputs of said AND gates are provided as the inputs thereof.

\* \* \* \* \*